No. 738,197. PATENTED SEPT. 8, 1903.
F. C. IRVINE.
MACHINE FOR MAKING BOX SHOOKS.
APPLICATION FILED MAY 18, 1903.
NO MODEL. 6 SHEETS—SHEET 1.

Witnesses
Theo. Laggard.
H. A. Bowman.

Inventor
Frank C. Irvine
By P. H. Gunckel
his Attorney.

No. 738,197. PATENTED SEPT. 8, 1903.
F. C. IRVINE.
MACHINE FOR MAKING BOX SHOOKS.
APPLICATION FILED MAY 18, 1903.
NO MODEL. 6 SHEETS—SHEET 3.

Witnesses
Theo. Lagaard
H. A. Bowman

Inventor
Frank C Irvine
By P. H. Gunckel
his Attorney

No. 738,197. PATENTED SEPT. 8, 1903.
F. C. IRVINE.
MACHINE FOR MAKING BOX SHOOKS.
APPLICATION FILED MAY 18, 1903.
NO MODEL. 6 SHEETS—SHEET 5.
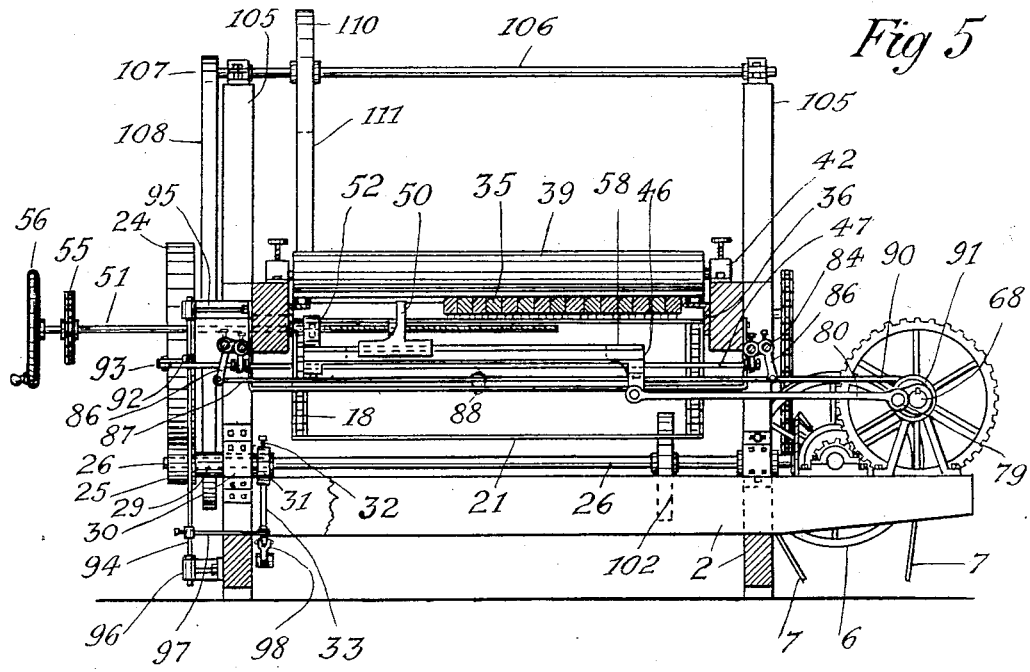
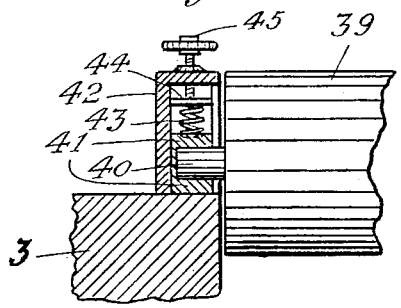
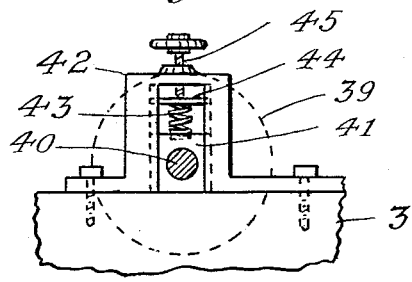
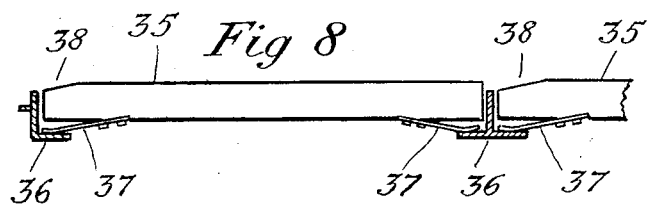
Witnesses
Theo Lagaard
H. A. Bowman
Inventor
Frank C. Irvine
By C. H. Gunckel
his Attorney

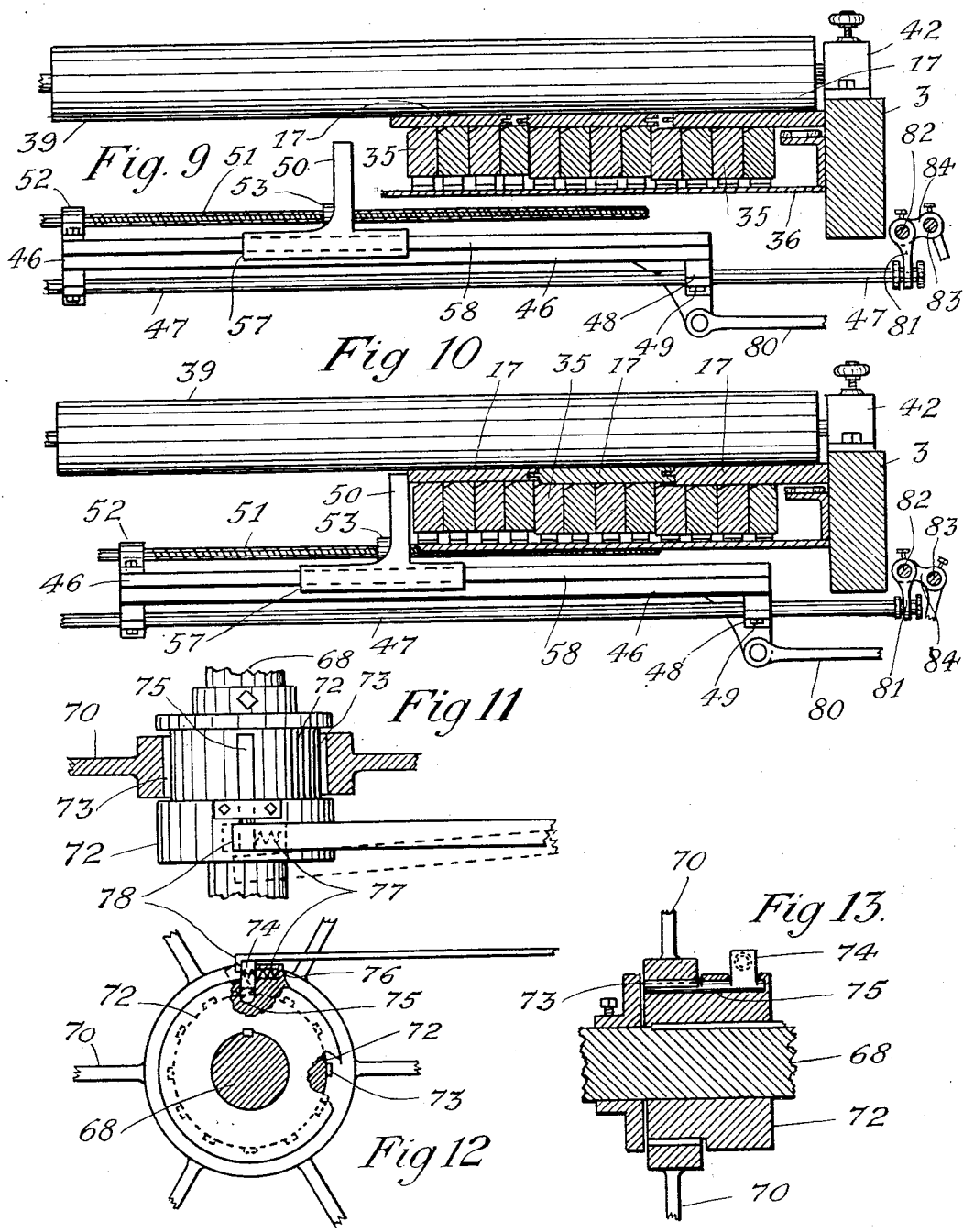

No. 738,197. Patented September 8, 1903.

UNITED STATES PATENT OFFICE.

FRANK C. IRVINE, OF MINNEAPOLIS, MINNESOTA, ASSIGNOR OF ONE-HALF TO COFFIN'S BOX & LUMBER COMPANY, OF MINNEAPOLIS, MINNESOTA, A CORPORATION OF MINNESOTA.

MACHINE FOR MAKING BOX-SHOOKS.

SPECIFICATION forming part of Letters Patent No. 738,197, dated September 8, 1903.

Application filed May 18, 1903. Serial No. 157,513. (No model.)

*To all whom it may concern:*

Be it known that I, FRANK C. IRVINE, a citizen of the United States, residing at Minneapolis, county of Hennepin, and State of Minnesota, have invented certain new and useful Improvements in Machines for Making Box-Shooks, of which the following is a specification.

My invention relates to machines for assembling boards or strips to form the shooks for boxes; and its object is to provide suitable mechanism for alining and pressing together tongued and grooved boards or strips to form box members, box sides, ends, covers, or bottoms and means for trimming off the edges of the members to make them of uniform width, if required.

Stated in a general way, my improved machine comprises a suitable main frame and tables, a hopper for containing the sets of boards, feed-chains with knockers for moving a set of boards from the hopper on the feed-table to position between the yielding table-section and superposed guide-rolls, horizontally-moving compression devices and means for reciprocating them to press the tongues into the grooves of the boards, means for operating the feed-chains and for arresting their movement during the operation of the compressing devices, means for causing the feeding movement of the chains to be resumed automatically upon completion of the compressing-device movements, and means for trimming the edges of the united boards as they are being moved toward the rear of the machine.

My improvements are illustrated in the accompanying drawings, in which—

Figure 1:
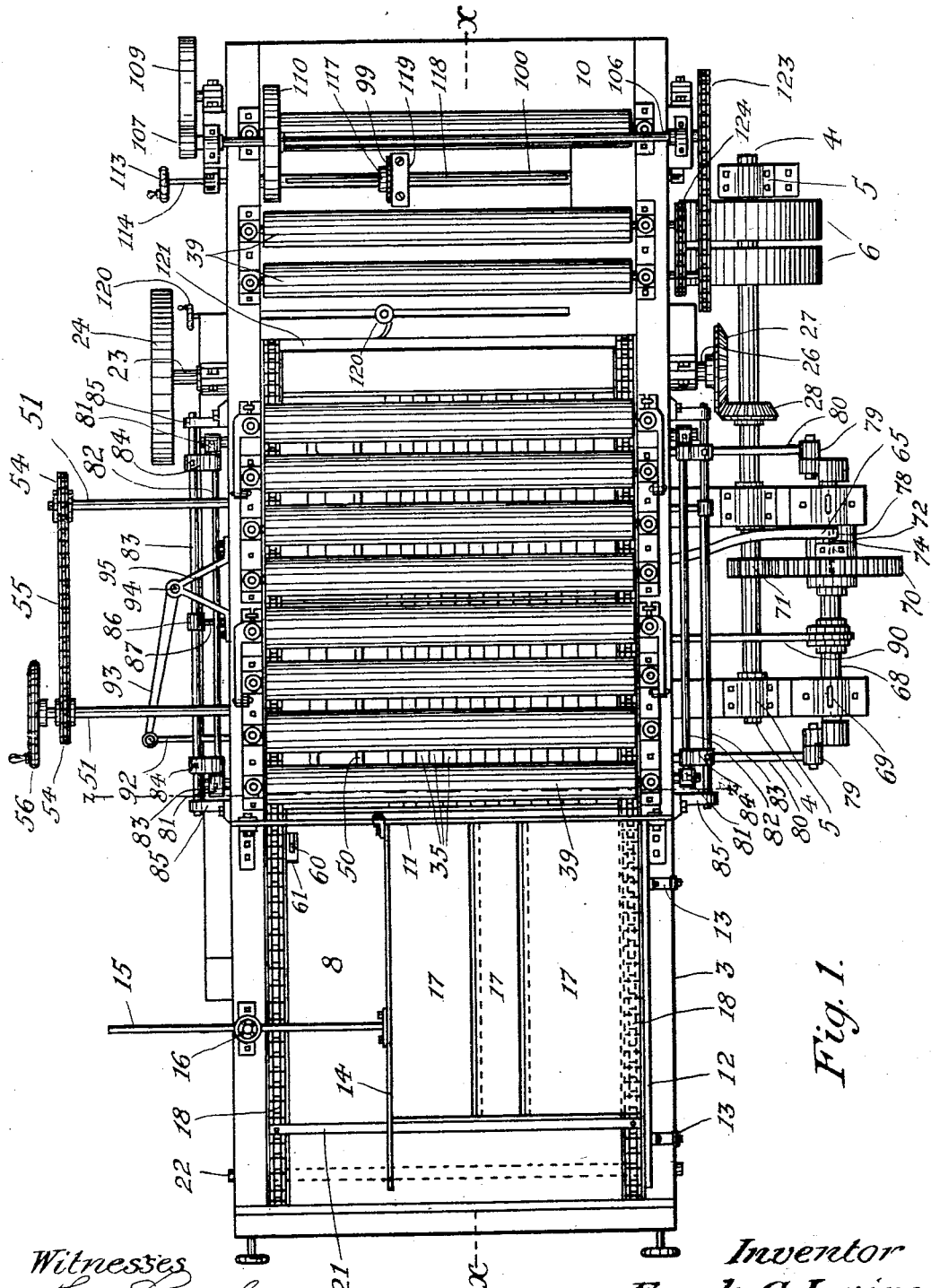
Figure 2:
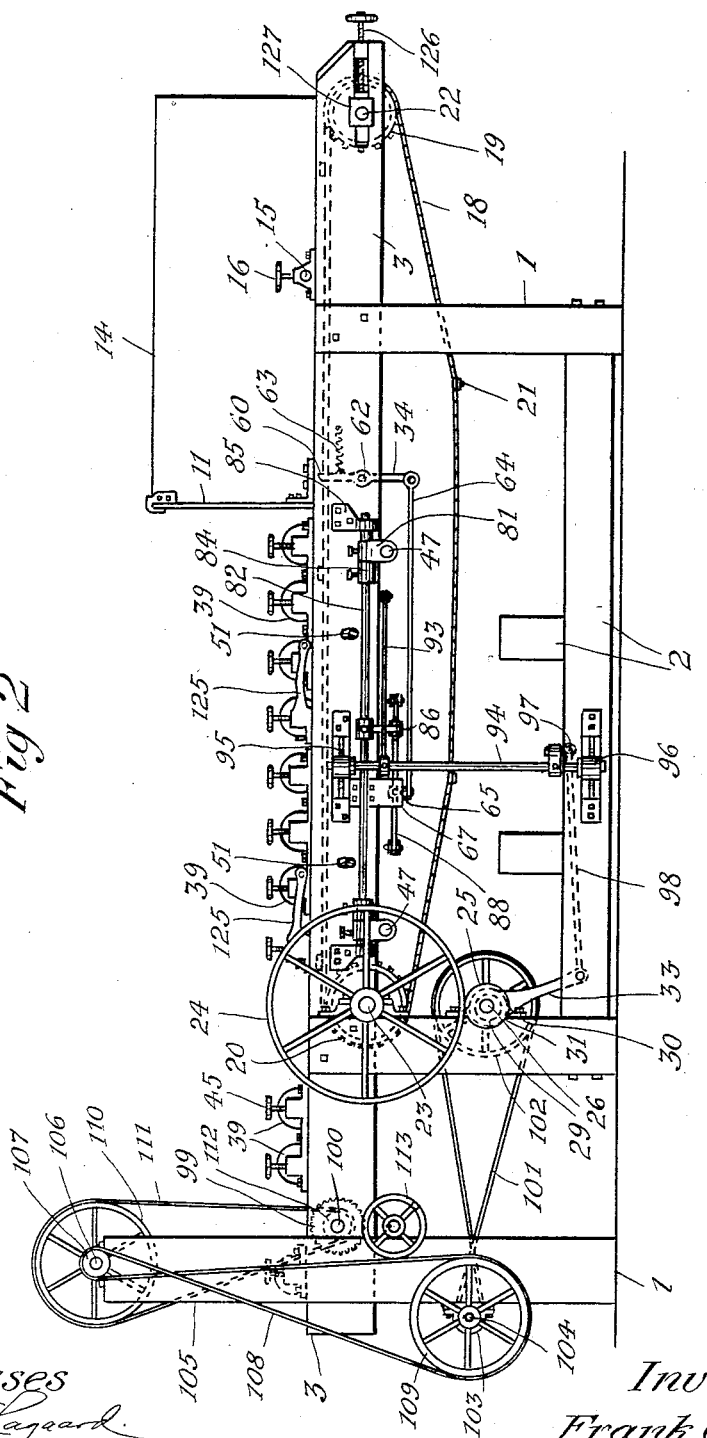
Figure 3:
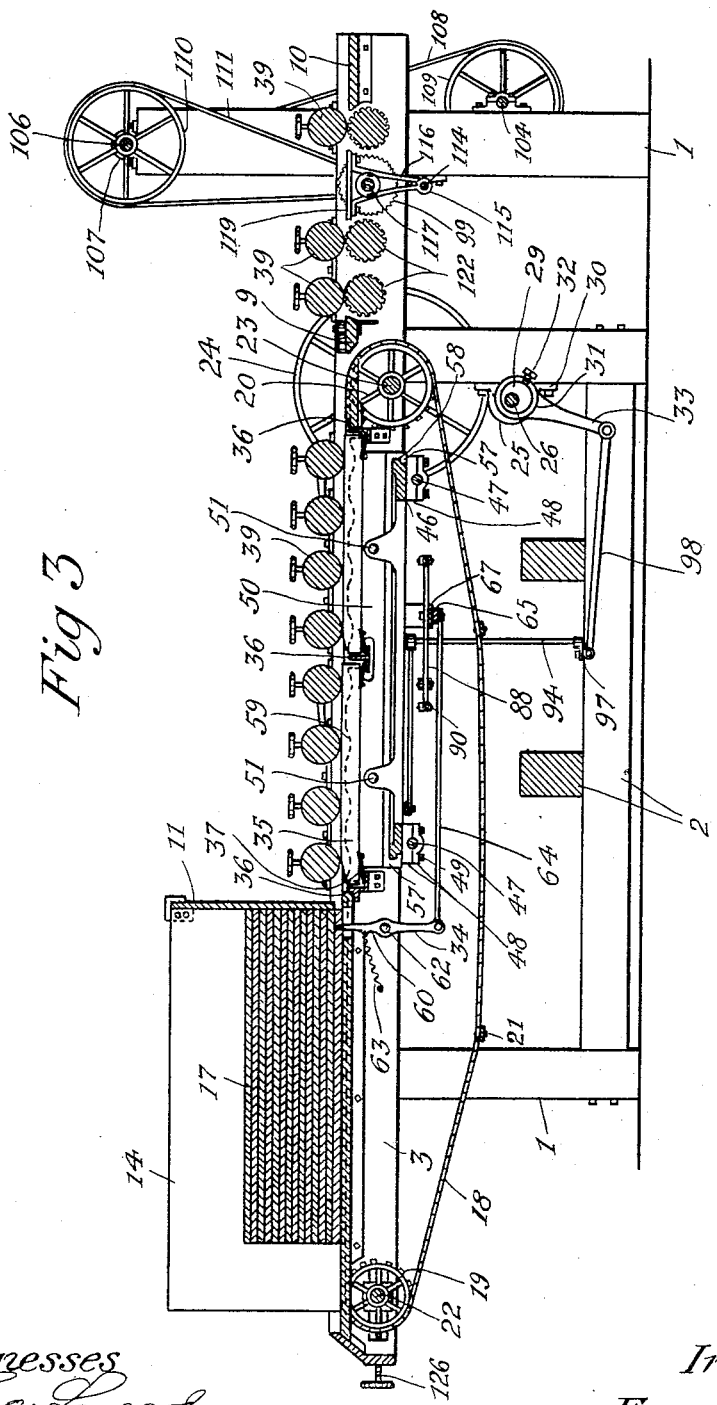
Figure 4:
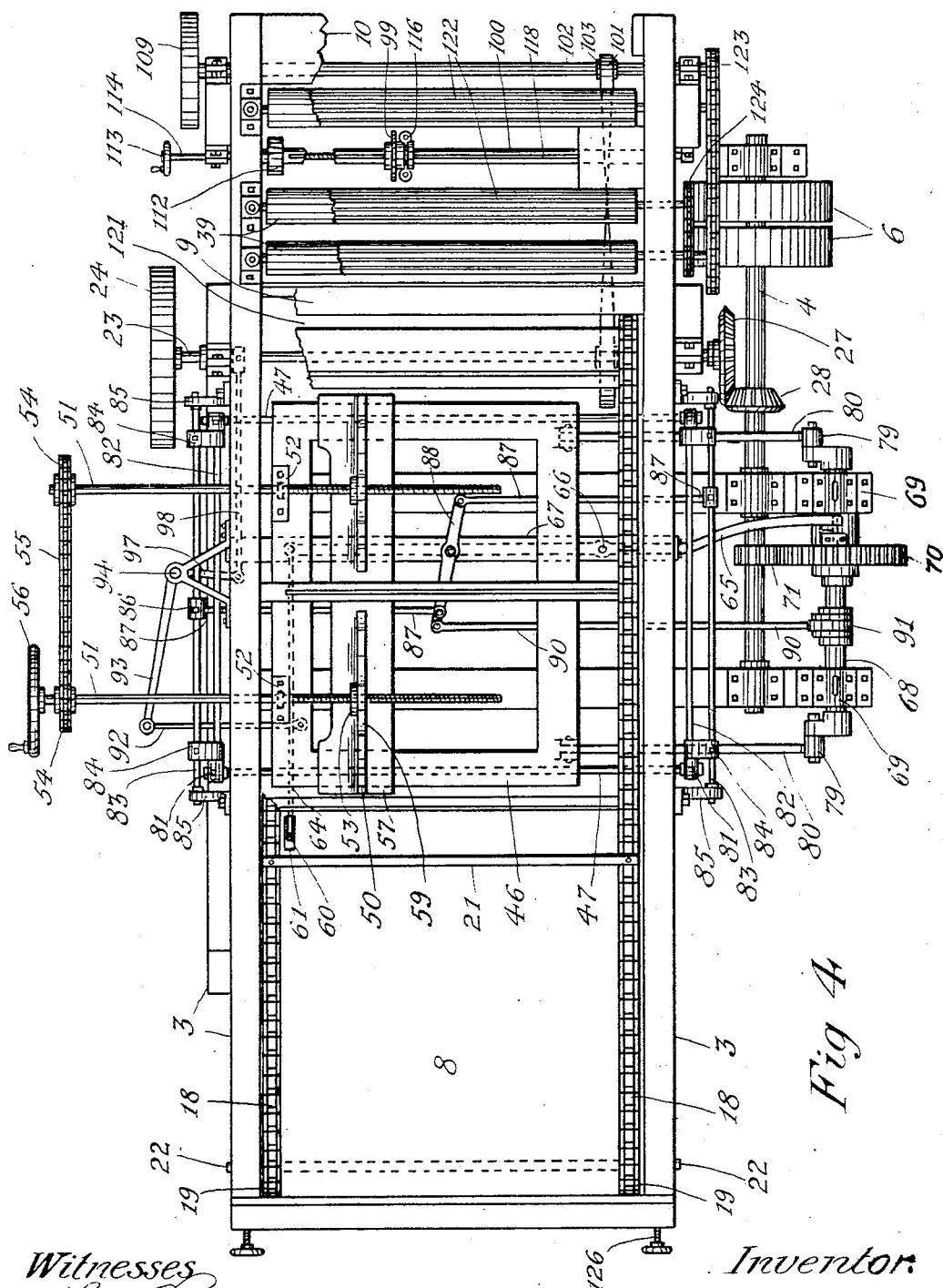

Figure 1 is a plan view of the machine. Fig. 2 is a side elevation. Fig. 3 is a vertical sectional view on the line $x\, x$ of Fig. 1. Fig. 4 is a plan view, some of the upper portions of the mechanism having been removed. Fig. 5 is a transverse sectional view on the line $z\, z$ of Fig. 1, and Figs 6 to 13 are details of parts to be hereinafter described.

In the drawings, 1 designates the posts, and 2 and 3, respectively, the lower and upper horizontal members of the main frame. The driving-shaft 4 is journaled in boxes 5 on cross-pieces 2 near the base of the main frame and is driven by a pulley 6 by means of a belt 7.

A stationary table 8 is provided on top of the front or feed end of the main frame on which the boards are to be piled, and other fixed tables 9 and 10 are provided near the opposite or discharge end of the frame on which the box members slide after their parts have been pressed together. On the table 8 is a hopper having side walls and an inner wall and open front. The inner wall 11 is fixed, while the one side wall 12 is connected by hinges 13 to the frame, so that it can be let down at will, and the opposite side 14 is adjustable for varying the width of the hopper by means of a rod 15 and set-screw 16. The tongued and grooved boards 17, which may be of varying widths, are piled on the table inside the hopper to be removed set by set by the action of the knockers of the feed-chains.

The feed-chains 18 are arranged at opposite sides of the machine on sprocket-wheels 19 and 20 and are provided with cross-bars or knockers 21 for conducting the material from the hopper to the compressing devices, and means are provided for operating them and for arresting their movement during the action of the compressing devices. The sprocket-wheels 19 are on a shaft 22, and the wheels 20 are on a shaft 23, both shafts being journaled in the upper part of the frame. On the shaft 23, outside the frame, is a friction-wheel 24 for driving the chains, and a small friction wheel or pinion 25 on a shaft 26 is arranged to be moved to and from contact with the wheel 24 for revolving it intermittently. The shaft 26 extends across the frame and has a bevel gear-wheel 27 in mesh with a like gear 28 on the driving-shaft 4, whereby the shaft 26 is run continuously. The small friction-wheel is moved to and from contact with the larger one by slightly raising and lowering the shaft 26. This is effected by means of a sleeve or journal-bearing 29, arranged in a box 30, which is fast to a post, the shaft 26 passing eccentrically through the bearing or sleeve 29, and the latter being free to turn in the box 30. A strap 31 is secured on the sleeve by a set-screw 32, and to the strap is attached a lever 33. The rocking of the lever causes the sleeve to turn in its box, and this serves to raise or lower the shaft 26 because of its eccentric position in the sleeve, and thereby to move the smaller friction-gear to and from contact with the larger gear. The mechanisms for actuating the lever 33 to start and stop the feed-chain movements and for reciprocating the compressing devices are controlled by the movements of a tripping-lever 34, arranged in the path of the knockers 21, near one side of the table 8, as will be hereinafter explained.

In the space between the rigid tables 8 and 9 are series of yielding slats 35, arranged with their upper edges normally on or parallel with the horizontal plane of the surfaces of those tables and adapted to constitute an intermediate table composed of yielding component parts. The ends of the slats seat on the horizontal flanges of transverse angle-plates 36, that are secured to opposite frame members 3. Two series of such slats are shown, but obviously a single series or set or more than two series or sets of such devices may be employed to meet varying conditions of work. Each slat is provided at both ends, on its under side, with springs 37, that seat on the angle-plates and adapt it to yield downward under pressure. The slats are free and independent of one another, but are placed side by side in close order, extending lengthwise of the machine. Thus the entire series of slats constituting the table-section and each individual slat may yield as required to permit the proper feeding onward of stock of varying thickness. The forward upper edges of the slats may be beveled, as shown at 38, so that their corresponding ends will be slightly below, while the upper surfaces of the bodies of the slats will be slightly above, the plane of the tables 8 and 9, as indicated in Fig. 3.

Above the yielding table-section is arranged a series of wooden guide-rollers 39, extending across the machine and mounted on the side frame-pieces 3. To enable them to coöperate with the slats in yielding to the pressure of stock of more than usual thickness, their gudgeons 40 are in bearings 41, which may be lifted in vertical ways in their journal-boxes 42. Springs 43 are interposed between the bearings 41 and superposed plates 44, and screws 45 are provided for regulating the tension of the springs. The slats and the rolls are thus made to coöperate in providing upper and lower yielding guides for the stock and are adapted to serve also as retarding devices, affording sufficient resistance to the forward movement of the stock to enable the carrying-bars or knockers 21 to press the rear edges of the stock boards or strips into alinement before the compressing device operates to unite them.

Beneath the yielding table is a rectangular frame 46, which is slidable crosswise of the machine on guide-rods 47, on which the frame is loosely mounted by means of upper and lower bearing-plates 48, connected by bolts 49.

On the frame 46 is an adjustable compressor bar or head 50 for pressing the boards together and against a stationary abutment at the opposite side of the table, which abutment may be one of the frame members 3. The position of the head 50 relative to the frame 46 may be regulated by the screws 51, the shanks of which are mounted in boxes 52, that permit them to turn without lengthwise movement and the threaded portions of which engage nuts 53, attached to upright portions of the head 50. The outer ends of the screw-shanks are provided with small sprocket-wheels 54, on which is a chain 55, and on one of the shanks is a hand-wheel 56, by means of which both screws can be turned in unison to adjust the head inward or outward to proper position to operate upon stock of different widths. The head is guided in its adjusting movements on the frame 46 by means of downward and inward flanges 57, that engage ribs 58, extending along the sides of the frame. The vertical portion of the presser-head has depressions 59 in its upper surface to avoid contact with the guide-rolls 39 when it is raised to operative position.

In the path of the knockers 21, near one side of the table 8, is the upper arm 60 of the tripping-lever 34, operating in a slot 61 in the table, and the lever is fulcrumed at 62 to a frame member 3 in position to be thrown over by a knocker to a point close to the inner edge of the table. A spring 63, connected to the frame and lever, serves to retract the latter when released from the knocker. To the lower arm of this lever is pivoted one end of a rod 64, that extends lengthwise of the machine and has its other end pivoted to a bar 65, extending across the machine and fulcrumed at 66 to a bracket or fixed support 67. The outer end of the bar 65 is intended to serve as a clutch-shifter for causing intermittent rotation of a short shaft 68 outside the machine-frame. This shaft is journaled in boxes 69 on frame members 2 and has upon it a loose gear-wheel 70, that is driven by a pinion 71 on the main shaft 4. Any suitable clutch mechanism may be employed by causing the shifter 65 to produce timely rotation of the shaft 68. In the device illustrated, which has proven satisfactory in use, the hub of the gear 70 is made to turn on a sleeve 72, that is fast to the shaft, and the hub is provided with an annular series of internal slots 73, extending parallel with the shaft. In the recess in the surface of the sleeve at one side of the hub is an upward dog 74, the base portion 75 of which is extended laterally within the hub and has its lower surface half round and its upper surface flat, so that it can be rolled on its axis within the recess containing it. When the dog is in upright position, as shown by full lines in Fig. 12, the upper surface of the part 75 is free from contact with the inner surface of the hub; but when the dog is tilted to the position shown by dotted lines a side of the part 75 will be engaged by a wall of one of the recesses in the hub and thereby cause the rotation of the sleeve and shaft. On the surface of the sleeve, adjacent to the dog, is a lug 76, that has a socket within which is a spring 77, bearing against the dog and tending to hold it in the position shown by dotted lines. The shifter 65 has a downward hook 78 on its end arranged to engage the dog and hold it in vertical position, as shown by full lines, while the feed-chains are moving; but when the trip-lever is thrown over and the shifter 65 is thereby operated the dog is freed from the shifter and is actuated by its spring to cause operative engagement of the hub and sleeve.

On the ends of the shaft 68 are cranks 79, from which connecting-rods 80 extend to the sliding frame 46 for reciprocating it to press and release the stock-boards. The ends of the transverse guide-rods 47, which support and guide the frame 46, are connected to flanges on loose sleeves 81, carried on the ends of two rods 82, which extend longitudinally of the machine at its opposite sides, and two other rods 83, which run parallel with but a little lower than the rods 82, are connected with the latter rods by links 84, that are loose on the rods 82, but are fast to the rods 83. The latter rods are supported by brackets 85 on the frame-pieces 3 and may be turned on their axes. The rocking of the rods 83 serves to swing the links 84 and to lift the rods 82 and with them the guide-rods 47 and frame 46. To each rod 83 is secured another link 86, that extends in downward direction and is connected to a rod 87, which extends toward the middle of the machine and is there connected to an arm of a lever 88, that is fulcrumed near its middle to the fixed bar or support 67. To one of the arms of the lever 88 is pivoted a connecting-rod 90, the other end of which is secured to the strap of an eccentric 91 on the shaft 68. By these means when the latter shaft is rotated the movement of the eccentric will swing the lever 88 and thereby cause the operation of the links 84 and 86 to raise simultaneously all parts of the frame 46 and bring the presser-head to proper position to be thrust against the edges of the stock-boards. In its lower or normal position the presser-head is below the plane of movement of the knockers and stock, and it is raised only for the purpose of moving it to operative position. The reciprocatory movements of the frame 46 serve the further function of stopping and starting the feed-chain movements by the following means: A bar 92 has its inner end connected to the frame 46 and its outer end to an arm 93, that is fast to a vertical shaft 94, which latter turns in a bearing on a bracket 95 at the upper part of the main frame and in a step 96 at the base. A second arm 97, that is fast to the shaft 94 and extends inward, is connected to a rearwardly-extending rod 98, that in turn is connected to the lever 33 for turning the sleeve 29 to raise and lower the friction-wheel 25. The inward movement of the frame 46 thus serves to cause the separation of the friction-gears, and its outward or return movement causes the gears to contact and the feed movement of the chains to be resumed.

If the stock-boards when pressed together form shooks of varying widths and it is desired to trim them to uniform widths, the sawing mechanism shown may be employed. This mechanism consists of a circular saw 99 on an arbor 100 near the rear end of the machine. The arbor is journaled in boxes on the frame-pieces 3 and is driven by power transmitted from the shaft 26. A belt 101 connects a pulley 102 on that shaft with a pulley 103 on a transverse shaft 104 at the lower rear portion of the machine, and above the latter, on a raised frame 105, is mounted another shaft 106, on which is a pulley 107, connected by a belt 108 with a pulley 109 on the shaft 104, and a pulley 110 on the shaft 106 is connected by a belt 111 with a pulley 112 on the saw-arbor.

The saw is adjustable along its arbor by the operation of a hand-wheel 113, which turns an adjusting-screw 114, that engages a nut 115 on the lower end of a carrier 116, which provides collars 117 at opposite sides of the saw and serves to adjust it. The arbor has a longitudinal groove 118, by means of which the saw may be keyed fast to the arbor while the latter turns freely in the carrier. On top of the carrier is a plate 119, adjacent to the saw, for the support of the boards as they are pressing the saw. An adjustable guiding device 120 is arranged on the table 9 to properly direct the boards to the saw.

The feed-chain wheels 20 are arranged below the table 9 and the knockers 21 descend through a slot 121 near the middle of the table. The feeding of the boards onward after the knockers have ceased to engage them is done by feed-rolls 122 in coöperation with upper guide-rolls 39, similar to those heretofore described. The feed-rolls are operated by means of chains 123 and 124, connecting sprocket-wheels on their respective axes with a like gear on the shaft 104. For convenience and to facilitate the placing and removing of the slats 35 two or more of the rolls 39 may have their journals in boxes on arms 125, that are hinged on the main frame to enable them to be lifted up and turned away to expose the ends of the slats. As the number of such slats employed depends upon the width of the boards to be compressed and as the width of the stock may be frequently varied, it is desirable that the required changes can be readily made.

The tension of the feed-chains 18 may be varied by the operation of the screws 126, which serve to move the bearings 127 for the shaft 22 inward or outward, and thereby affect the chain tension.

In operation one or more sets of stock-boards having been placed in the hopper and the feed-chains being in operation, the knocker first to traverse the table 8 will engage the lower set of boards and move them forward between the slats 35 and rolls 39, and the frictional resistance offered by the latter will cause the knocker-bar to aline the adjacent ends of the boards. In its passage the knocker throws over the trip-lever 34, the operation of which serves to start the rotation of the crank-shaft 68, and thereby start the movement of the carrier-frame 46, and thus release the friction-gears 24 and 25, and thereby stops the movement of the feed-chains, and the mechanisms are so arranged that the knocker will stop when it has reached the end of the table 8, and the stock-boards are delivered to the slats and rolls. In this location the knocker will not be in the way of the compressor-head in its rising movement. The same throw of the trip-lever will have caused the operation of the shaft 68, and thereby first the lifting and next the reciprocation of the frame 46 and the consequent compression of the boards to force the tongues into the grooves. The further movement of the shaft 68 to complete a single rotation serves then to return and lower the frame to its original position and concurrently to move the friction-gears to contact, and so renew the movement of the feed-chains. The stock-boards having been united in the manner stated, the knocker then carries them over the table 9 to the feed-rolls, by which they are conducted away from the machine. If the edges require trimming, the saw may be utilized in the manner heretofore described.

Many of the details of structure shown and described can be changed without affecting the mode of operation of the parts or the plan of operation of the mechanism as a whole, and therefore I do not wish to restrict myself to the specific means set forth.

What I claim, and desire to secure by Letters Patent, is—

1. In a machine for making box-shooks, in combination, a feed-table for supporting stock-boards, means for feeding them therefrom in successive sets, a yielding sectional table and guide-rolls for holding them in horizontal position as they are fed from the table, means for pressing the boards together laterally while so held, and means for moving them onward upon completion of such pressing operation, substantially as set forth.

2. In a machine for making box-shooks, the combination with a compressor; of feed-chains and knockers for feeding sets of boards to position to be operated upon by the compressor; devices actuated by the knocker for arresting the feed movement concurrently with the placing of the boards in such position; means for holding the boards in a horizontal plane; means for reciprocating the compressor to force the tongues into the grooves of the boards, and automatic means for causing the resumption of the feed movement of the chains.

3. In a machine for making box-shooks, in combination, a feed-table for holding stock-boards, means for feeding them therefrom in successive sets, guide-rolls, and a table composed of independent yielding narrow slats for holding them in horizontal position as they are fed from the table, means for pressing the boards together laterally while so held, and means for moving them onward upon completion of such pressing operation, substantially as set forth.

4. In a machine for making box-shooks, in combination, a feed-table for holding stock-boards, means for feeding them therefrom in successive sets, guide-rolls extending transversely and a series of independent yielding slats extending longitudinally of the boards for holding them in horizontal position as they are fed from the table, means for pressing the boards together laterally while so held, and means for moving them onward upon completion of such pressing operation, substantially as set forth.

5. In a machine for making box-shooks, in combination, a feed-table for holding stock-boards, means for feeding them therefrom in successive sets, guide-rolls extending transversely and a series of independent yielding slats extending longitudinally of the boards for holding them in horizontal position as they are fed from the table, an underlying compressor-frame, means for lifting and thrusting it to press the boards together and for retracting and lowering it, and means for the timely interruption and renewal of the feed-mechanism movements, substantially as set forth.

6. In a machine for making box-shooks, the combination with a yielding table adapted to hold sets of boards of varying thickness and composed of independent spring-supported slats extending lengthwise of the machine, and coöperating rolls arranged transversely above the slats, of a compressor for thrusting the boards horizontally to press their tongues into their grooves, substantially as set forth.

7. In a machine for making box-shooks, in combination, a feed-table for holding stock-boards, means for feeding them therefrom in successive sets, guide-rolls and a yielding table-section consisting of independent slats for supporting them in horizontal position as they are fed from the feed-table, means for pressing the boards together laterally while so held, and means for moving them onward upon completion of such pressing operation, substantially as set forth.

8. In a machine for making box-shooks, in combination, a feed-table for supporting stock-boards, means for feeding them therefrom in successive sets, a yielding table-section consisting of independent slats for supporting them in horizontal position as they are fed from the feed-table, means for pressing the boards together laterally while so held, means for moving them onward upon completion of such pressing operation, and a sawing mechanism for trimming the edges of the boards as they pass onward from the compressor, substantially as set forth.

9. In a machine for making box-shooks, the combination with a compressor and its carrier, of feed-chains and knockers for feeding sets of boards to position to be operated upon by the compressor, mechanism for reciprocating the compressor-carrier, a trip-lever actuated by the knocker movement for causing the operation of the latter mechanism, and devices actuated by the movement of the compressor-carrier for causing and interrupting the feed-chain movements, substantially as set forth.

10. In a machine for making box-shooks, the combination with a compressor and its carrier, of feed-chains and knockers for feeding sets of boards to position to be operated upon by the compressor, a crank-shaft and connections for reciprocating the compressor-carrier, a trip-lever and connections actuated by the knocker movement for causing the crank-shaft to rotate, and devices actuated by the movement of the compressor-carrier for causing and interrupting the feed-chain movements, substantially as set forth.

11. In a machine for making box-shooks, the combination with a compressor and its carrier, of feed-chains and knockers for feeding sets of boards to position to be operated upon by the compressor, a crank-shaft and connections for reciprocating the compressor-carrier, a trip-lever and connections actuated by the knocker movement for throwing a clutch-shifter, and a suitable clutch device engaged by the shifter to cause the crank-shaft to rotate, substantially as set forth.

12. In a machine for making box-shooks, the combination with a compressor, of feed-chains and knockers for feeding sets of boards to position to be operated upon by the compressor, friction-gears for causing the feed-chains to operate, means for reciprocating the compressor-carrier, and connections actuated by the movement of the compressor to move said friction-gears to and from contact for causing and interrupting the feed-chain movements, substantially as set forth.

13. In a machine for making box-shooks, the combination with a compressor and its carrier, of feed-chains and knockers for feeding sets of boards to position to be operated upon by the compressor, friction-gears for causing the feed-chains to operate, mechanism for reciprocating the compressor-carrier, a trip-lever actuated by the knocker movement for causing the operation of the compressor mechanism, and connecting devices actuated by the compressor-carrier for moving said friction-gears to and from contact, substantially as set forth.

In testimony whereof I have signed my name to this specification, in the presence of two subscribing witnesses, this 24th day of April, 1903.

FRANK C. IRVINE.

Witnesses:
  P. H. GUNCKEL,
  H. A. BOWMAN.